Patented Aug. 23, 1949

2,479,938

UNITED STATES PATENT OFFICE 2,479,938

TETRAALKYL PHENYL TRIPHOSPHATES

Gennady M. Kosolapoff, Dayton, Ohio, assignor to Monsanto Chemical Company, St. Louis, Mo., a corporation of Delaware No Drawing. Application December 6, 1946, Serial No. 714,641

3 Claims. (Cl. 260—461)

This invention provides a series of new compounds having the probable structure:

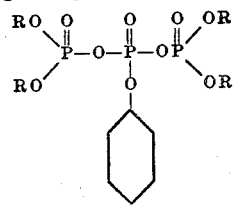

where R is any normal or branched chain alkyl group having from 1 to 18 carbon atoms.

The above new compounds which have the empirical formula

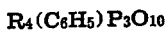

have been found to possess exceptionally good insecticidal activity against aphids, red spiders, citrus mites and other insects. The high activity is retained at high dilutions or dispersions. When employed on infested vegetation in concentrations ordinarily employed for combating insect pests, the compounds are without deleterious effect upon the vegetation.

In the above structural formula, the alkyl groups R may be methyl, ethyl, propyl, isopropyl, butyl, isobutyl, amyl, isoamyl, tertiary amyl, hexyl, 2-ethyl butyl, octyl, 2-ethyl hexyl, capryl, decyl, lauryl, myristyl, cetyl or stearyl.

Several methods are available for the preparation of the present products, one of which may be illustrated by the reaction:

1. $2(RO)_2POCl + (NaO)_2POOC_6H_5 \longrightarrow$

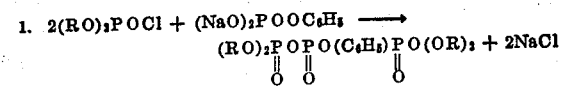

wherein two mols of a dialkyl chlorophosphate are reacted with one mol of disodium phenyl phosphate. The product obtained by this reaction is substantially pure tetraalkyl phenyl triphosphate.

Another method may be carried out as indicated by the following reaction:

2. $2(RO)_2PONa + POCl_2(OC_6H_5) \xrightarrow{(O_2)}$

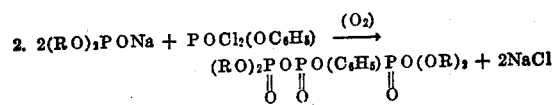

wherein two mols of a dialkyl sodium phosphite are reacted with one mol of dichlorophenyl phosphate. The product obtained by this reaction is a mixture of tetraalkyl phenyl triphosphate and tetraalkyl phenyl triphosphite. The ate compound is present in the mixture in major proportion and usually to the extent of from 70–75% by weight of the mixture.

The oxygen shown as taking part in reaction 2 above may be supplied by the oxygen of the air or by a disproportionation reaction as pointed out by P. Nylen Diss. Upsala 1930.

The reactions are carried out by mixing the reactants together in an inert solvent such as hexane, the reaction occurring with the precipitation of NaCl. By heating to reflux the reaction is completed, after cooling the reaction mass is then centrifuged or filtered in order to remove the precipitated NaCl. The solvent is evaporated in a vacuum and the product obtained directly as the residue remaining after evaporation of the solvent.

The following example illustrates the preparation of tetrabutyl phenyl triphosphate:

Example 1

Two gram mols of dibutyl chlorophosphate are added to a hexane solution containing one mol of disodium phenyl phosphate. The mixture is stirred for one-half hour, during which time NaCl begins to precipitate. The solution is then heated to boiling under reflux for one hour then cooled and filtered. The clarified solution is evaporated in vacuum to remove the solvent. The product remaining after evaporation of the solvent is substantially pure tetrabutyl phenyl triphosphate and is obtained as a clear, yellow oil.

Example 2

38.8 grams of dibutyl phosphite were reacted with 4.6 grams of sodium in 500 cc. of hexane and the resulting solution, after the sodium had completely dissolved, was treated with 21.1 grams of phenyl dichlorophosphate for one-half hour. NaCl precipitation began in 20 minutes and was completed by stirring the mixture for one-half hour, followed by heating to the boiling point under reflux for a short period of time. After cooling the mixture, the solution was centrifuged and the solvent evaporated by distillation in vacuum. The resulting product amounting to 48 grams was recovered as a clear, yellowish oil. This product consists of a mixture of tetrabutyl phenyl triphosphate and containing some tetrabutyl phenyl triphosphite.

Example 3

0.1 mol of dry disodium phenyl phosphate was reacted in 500 cc. dry toluene with 0.2 mol of dipropyl chlorophosphate at reflux for 6 hours. After removal of sodium chloride the tetrapropyl phenyl triphosphate was isolated in 100% yield as a yellowish oil.

Example 4

Two gram mols of diethyl chlorophosphate are added to a hexane solution containing one mol of disodium phenyl phosphate. NaCl precipitates as in Example 2. The solution is heated to the refluxing temperature for one hour, cooled and filtered. The clarified solution is evaporated in vacuum to remove hexane. The product is substantially pure tetraethyl phenyl triphosphate and is obtained in the form of a yellow oil.

Example 5

Two gram mols of di-(2-ethylhexyl)chlorophosphate are added to a hexane solution containing one mol of disodium phenyl phosphate. NaCl precipitates as described in Example 2. The solution is boiled at the refluxing temperature for approximately one hour, then cooled and filtered. The clarified solution is then evaporated in a vacuum to remove solvent. The product thus obtained is substantially pure tetra-(2-ethylhexyl) phenyl triphosphate, which occurs as a yellowish oil.

Example 6

A quantity of tetrabutyl phenyl triphosphate, produced by the method in Example 2 above, was dissolved in xylene in a concentration of one part of the triphosphate to 500 parts of xylene and then applied to vegetation infested with aphids (*Myzus persicae*). The application resulted in a 100% kill of aphids. The solution was then diluted with xylene to give a concentration of one part of triphosphate to 1000 parts of xylene. When applied to vegetation infested with *Myzus persicae* it gave a 96.9% kill of this insect.

A further test against another variety of aphid (*Myzus porosus*) at a 1 to 500 dilution gave a 100% kill.

An additional test against red spiders at a 1 to 500 dilution also gave a 100% kill.

For the purpose of combating insect pests the present triphosphates may be employed either in the pure form or as a mixture of the triphosphate and triphosphite, or the distillable esters (methyl, ethyl, propyl) may be purified by vacuum distillation of the mixture and the tetraalkyl phenyl triphosphate employed in pure form as the active ingredient in the insecticidal composition.

The present triphosphates undergo slow hydrolysis in aqueous solution so that if it is desired to store the product in form ready for application it should preferably be maintained in the anhydrous or water-free condition. If the insecticidal composition is prepared in non-anhydrous form the material should be utilized shortly after preparation in order to realize the maximum effectiveness of the active ingredient.

The tetraalkyl phenyl triphosphates may be dissolved in organic solvents such as carbon tetrachloride, ethylene dichloride, alcohols such as ethyl, isopropyl or higher alcohols, esters such as ethyl acetate or in aromatic solvents such as benzene, ortho-dichlorobenzene, toluene and xylene. They may also be dissolved or emulsified with the usual petroleum solvents utilized for this purpose. Suitable emulsions may be made by dissolving the active material in xylene or the like, adding an emulsifying agent and then when the material is to be used adding the xylene solution of the active material to water in the proper concentration.

The products may also be mixed in various proportions with finely divided carrier solids such as powdered sulfur, talc, bentonite, wood flour, starch, carbon black, etc., and the powder used as an insecticidal dust in the usual manner.

The powders, solutions or emulsions may be applied to insect infested vegetation by mechanical dusting or by atomizing the liquid solution or emulsion in the customary manner.

When the present active compounds are employed in combination with solvents, dusts or in emulsified form, they maintain their initial high activity over a very high range of dilution and may be used without injury to the host plant.

The present products are useful for combating those pests against which nicotine has been used in the past, such as flies, moths, beetles, plant lice, etc.

The present tetraalkyl phenyl triphosphates may be used alone or as a substitute for nicotine or they may be combined with nicotine in various proportions and a combination insecticide obtained having increased effectiveness against insect pests. The present products may also be combined with alpha, alpha-di(p-chlorophenyl)-beta, beta, beta-trichlorethane (DDT) in various proportions.

When a tetraalkyl phenyl triphosphate is used alone against insecticidal pests upon fruits and vegetables it has been found that the spray residue left upon the fruit or vegetable rapidly becomes non-toxic to animal organisms. This effect, while not completely understood, is thought to be the result of the hydrolysis of the triphosphate ester, which reaction is believed to be induced by the moisture of air. As a result, spray residues of the present phosphates which are several or more days old need generally not be removed by washing, as is the case with nicotine or other poisonous insecticides.

Among the tetraalkyl phenyl triphosphates which are useful in the present invention may be mentioned the following:

> Tetramethyl phenyl triphosphate
> Tetraethyl phenyl triphosphate
> Tetrapropyl phenyl triphosphate
> Tetraamyl phenyl triphosphate
> Tetrahexyl phenyl triphosphate
> Tetraoctyl phenyl triphosphate
> Tetradecyl phenyl triphosphate
> Tetralauryl phenyl triphosphate
> Tetramyristyl phenyl triphosphate
> Tetracetyl phenyl triphosphate
> Tetrastearyl phenyl triphosphate The active constituent of the present insecticidal composition, the tetraalkyl phenyl triphosphate, having an alkyl group of from 1 to 18 carbon atoms may be formulated with any insecticide carrier such as any powder, solvent or emulsion.

What I claim is:

1. Compounds having the formula:

$$R_4(C_6H_5)P_3O_{10}$$

where R is an alkyl group having from 1 to 18 carbon atoms.

2. Tetrabutyl phenyl triphosphate.
3. Tetrapropyl phenyl triphosphate.

GENNADY M. KOSOLAPOFF.

(References on following page)

REFERENCES CITED

The following references are of record in the file of this patent:

UNITED STATES PATENTS

| Number | Name | Date |
|---|---|---|
| 1,748,675 | Lommel | Feb. 25, 1930 |

OTHER REFERENCES

"Chem. & Eng. News," Sept. 10, 1945, pages 1520–1521.

Bibliography of Scientific and Industrial Reports for September 13, 1946 (U. S. Dep't of Commerce, Office of Technical Services), page 839 and PB33, 318, referred to on said page, pages 2 and 8.

Adler et al., "Chemical Industries," vol 51, page 517 (October 1942).

Report No. 252, "Insecticides, Insect Repellants, Rodenticides and Fungicides of I. G. Farbenindustrie," page 10, released January 11, 1946, by the Office of the Publication Board, Department of Commerce, Washington, D. C.